United States Patent
Hwang et al.

(10) Patent No.: US 9,794,845 B2
(45) Date of Patent: Oct. 17, 2017

(54) METHOD AND TERMINAL FOR APPLYING CHANGED SYSTEM INFORMATION

(71) Applicant: LG ELECTRONICS INC., Seoul (KR)

(72) Inventors: Daesung Hwang, Seoul (KR); Dongyoun Seo, Seoul (KR); Yunjung Yi, Seoul (KR); Bonghoe Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 14/647,427

(22) PCT Filed: Nov. 26, 2013

(86) PCT No.: PCT/KR2013/010759
§ 371 (c)(1),
(2) Date: May 26, 2015

(87) PCT Pub. No.: WO2014/098384
PCT Pub. Date: Jun. 26, 2014

(65) Prior Publication Data
US 2015/0304925 A1    Oct. 22, 2015

Related U.S. Application Data

(60) Provisional application No. 61/737,833, filed on Dec. 17, 2012, provisional application No. 61/765,002, filed on Feb. 14, 2013.

(51) Int. Cl.
*H04W 36/20* (2009.01)
*H04L 5/00* (2006.01)
(Continued)

(52) U.S. Cl.
CPC ........... *H04W 36/20* (2013.01); *H04J 11/005* (2013.01); *H04L 1/1896* (2013.01); *H04L 5/00* (2013.01);
(Continued)

(58) Field of Classification Search
None
See application file for complete search history.

(56) References Cited

U.S. PATENT DOCUMENTS

2005/0164683 A1* 7/2005 Roberts ................. H04W 68/00
455/412.2
2005/0177623 A1* 8/2005 Roberts ................. H04W 48/12
709/213
(Continued)

FOREIGN PATENT DOCUMENTS

KR    10-2008-0046100    5/2008
WO    2011/035420       3/2011

OTHER PUBLICATIONS

PCT International Application No. PCT/KR2013/010759, Written Opinion of the International Authority dated Feb. 14, 2014, 1 page.

*Primary Examiner* — Steven H Nguyen
(74) *Attorney, Agent, or Firm* — Lee Hong Degerman Kang & Waimey

(57) ABSTRACT

According to one disclosure of the present specification, a method for applying system information changed in a terminal is presented. The method for applying the changed system information includes the steps of: receiving an indicator providing notice of a change of a system information set from a cell; receiving information on the time when the change of system information is applied; when the indicator is received in subframe n, determining that the changed system information is applied after k periods based on the information from the n subframe.

11 Claims, 17 Drawing Sheets

(51) Int. Cl.
  *H04J 11/00*   (2006.01)
  *H04W 72/04*   (2009.01)
  *H04B 7/26*    (2006.01)
  *H04L 1/18*    (2006.01)

(52) U.S. Cl.
  CPC ..... *H04W 72/044* (2013.01); *H04W 72/0406* (2013.01); *H04B 7/2656* (2013.01); *H04L 1/1812* (2013.01)

(56) References Cited

U.S. PATENT DOCUMENTS

| | | | | |
|---|---|---|---|---|
| 2007/0287440 | A1* | 12/2007 | Benkert | H04W 24/04 455/422.1 |
| 2008/0212522 | A1* | 9/2008 | Ko | H04W 48/12 370/328 |
| 2009/0253422 | A1* | 10/2009 | Fischer | H04W 48/08 455/418 |
| 2010/0272015 | A1 | 10/2010 | Chmiel et al. | |
| 2010/0272037 | A1* | 10/2010 | Lee | H04W 52/0235 370/329 |
| 2011/0281575 | A1* | 11/2011 | Sharma | H04W 24/02 455/422.1 |
| 2012/0213203 | A1 | 8/2012 | Jung et al. | |
| 2013/0301492 | A1* | 11/2013 | Ji | H04W 72/042 370/280 |
| 2014/0036669 | A1* | 2/2014 | Yang | H04N 21/2365 370/230 |
| 2014/0301344 | A1* | 10/2014 | Lee | H04W 74/0833 370/329 |

\* cited by examiner

METHOD AND TERMINAL FOR APPLYING CHANGED SYSTEM INFORMATION

CROSS-REFERENCE TO RELATED APPLICATIONS

This application is the National Stage filing under 35 U.S.C. 371 of International Application No. PCT/KR2013/010759, filed on Nov. 26, 2013, which claims the benefit of U.S. Provisional Application Nos. 61/737,833, filed on Dec. 17, 2012 and 61/765,002, filed on Feb. 14, 2013, the contents of which are all hereby incorporated by reference herein in their entirety.

BACKGROUND OF THE INVENTION

Field of the Invention

The present invention relates to wireless communications.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, next-generation mobile communication systems are predicted to add small-sized cells with small coverage and turn-on/off capability and relay nodes to the coverage of a macro cell.

However, adding small-sized cells and relay nodes increases density, thus leading to increased interference. Accordingly, there is, depending on circumstances, a need for restricting (or limiting) the transmission of some uplink physical channels or downlink physical channels in order to mitigate interference.

Meanwhile, the small-sized cells may be required to temporarily turn off or vary for mitigated interference, and this requires system information to be changed. However, there are no conventional efficient procedures to vary system information.

SUMMARY OF THE INVENTION

According to a first embodiment of the disclosure, a macro cell 200 or a small cell 300a may transmit an instruction for restricting (or limiting) uplink/downlink to a UE 100. Accordingly, the UE 100 may abstain from transmitting a particular physical channel on uplink during a particular sub-frame or radio frame, or the UE 100, the macro cell 200 or small cell 300a might not transmit a particular physical channel on downlink during a particular sub-frame or radio frame.

According to a second embodiment of the disclosure, a detailed structure of an uplink/downlink restriction instruction is proposed.

According to a third embodiment of the disclosure, there is proposed a scheme in which, when a small cell 300b is required to be turned on or off to mitigate interference or to be changed to mitigate interference, the small cell 300b may efficiently vary and manage system information transmitted to the UE 100.

To achieve the above objects, according to the third embodiment of the disclosure, there is provided a method for applying changed system information. The method may performed by a terminal and comprise: receiving, from a cell, an indicator indicating a change in a set of system information; receiving information on a time when the change in the system information is to be applied; and when the indicator is received in sub-frame n, determining that the changed system information is applied at a time when k intervals are elapsed after sub-frame n, wherein the k intervals are based on the information.

The system information may include one or more of an on or off state of the cell, a system bandwidth, a downlink carrier frequency, a CP (cyclic prefix) length, a PHICH (physical hybrid-ARQ Indicator Channel) setting, and an SFN (system frame number).

The indicator may be received even when any one or more of a tracking offset, a cell ID, a virtual cell ID, and information on various cell-unique setting parameters, other than the system information, are changed.

The indicator may be received, included in a field of an MIB (Master Information Block) or is received through an RRC (Radio Resource Control) signal.

The indicator may be represented in a one-bit length. And, the indicator may be toggled to any one of bit 0 and bit 1 whenever a set of the system information is changed.

The information on the time may indicate the number k of sub-frames or k ms.

When the indicator is received, a virtual bandwidth may be set by the cell, and wherein the terminal performs blind decoding on a PDCCH search space according to the virtual bandwidth.

The determining may include: determining whether the set of the changed system information is supported by the terminal; and when the set of the changed system information is not supported by the terminal, transmitting to the cell information that a handover is required by the terminal.

Information on another neighbor cell may be received together with the changed system information for a case where the terminal cannot support the changed information.

When the cell is a secondary cell of carrier aggregation (CA), the cell operates as a first secondary cell before the system information set is changed, and the cell operates as a second secondary cell after the system information set is changed. A handover may be performed from the first secondary cell to the second secondary cell at the determined time.

The method may further comprise: receiving a message for requesting to deactivate the first secondary cell corresponding to the system information before the change and to activate the second secondary cell corresponding to the system information after the change.

Meanwhile, according to the third embodiment of the disclosure, there is provided a terminal applying changed system information. The terminal may comprise: a reception unit configured to receive an indicator indicating a change in a set of system information from a cell and receive information on a time when the change in the system information is applied; and a processor configured to determine that the changed system information is applied at a time when k intervals are elapsed after sub-frame n, wherein the k intervals are based on the information.

According to an embodiment of the disclosure, the UE 100 may abstain from transmitting a particular physical channel on uplink during a particular sub-frame or radio frame or the serving cell may abstain from transmitting a particular physical channel on downlink during a particular sub-frame or radio frame, thus mitigating interference.

According to another embodiment of the disclosure, system information, when required to be changed, may be efficiently changed and managed.

DETAILED DESCRIPTION OF EXEMPLARY EMBODIMENTS

Figure 1:
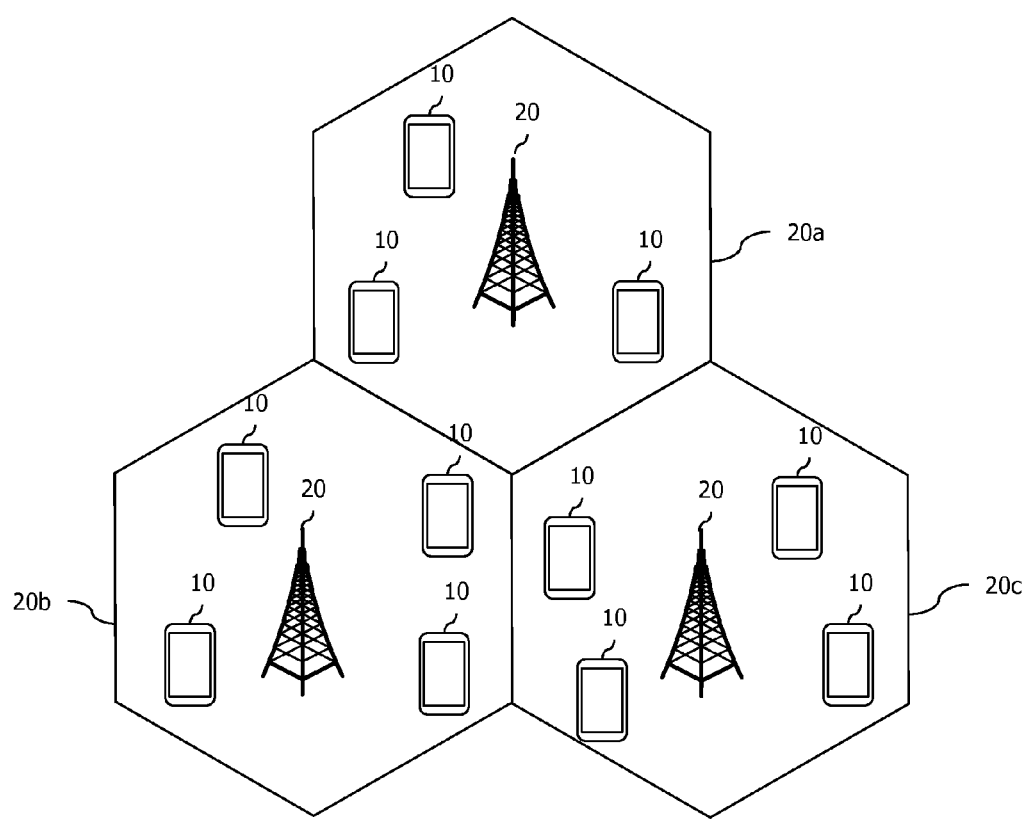
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (MUE) may be stationary or mobile, and may be denoted by other terms such as device, wireless device, terminal, MS (mobile station), UT (user terminal), SS (subscriber station), MT (mobile terminal) and etc. A base station generally refers to a fixed station that communicates with a wireless device and may be denoted by other terms such as eNB (evolved-NodeB), BTS (base transceiver system), or access point.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/canceled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

FIG. 1 shows a wireless communication system.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors). User equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
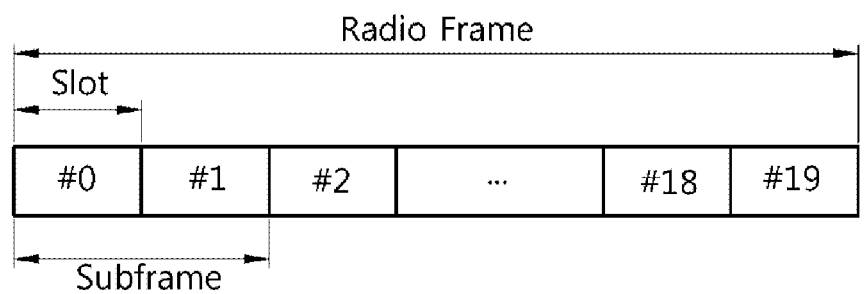
FIG. 2 illustrates the structure of a radio frame according to FDD in 3GPP LTE.

FIG. 2 shows a downlink radio frame structure according to FDD of 3rd generation partnership project (3GPP) long term evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
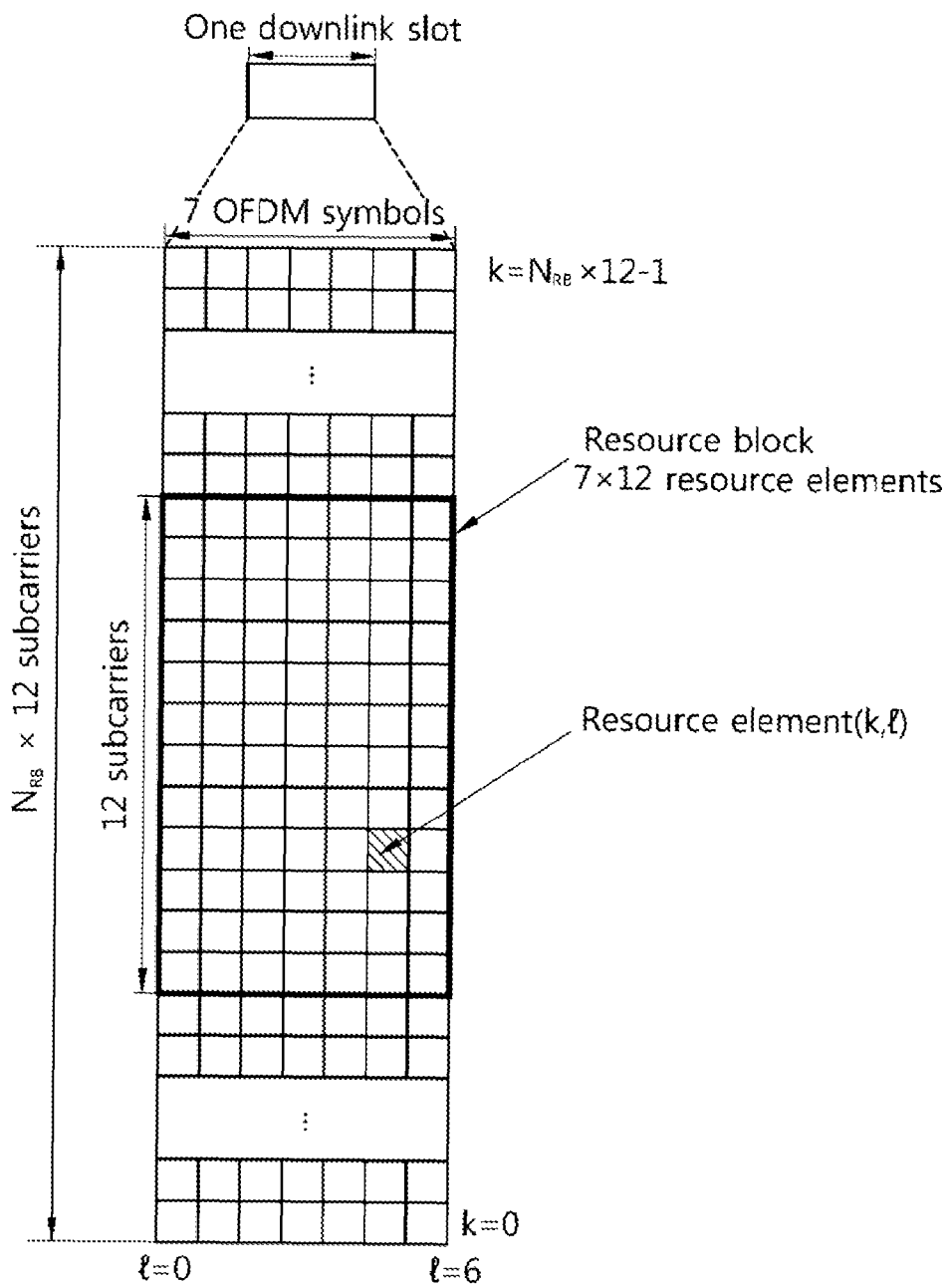
FIG. 3 is a view illustrating an exemplary resource grid for one uplink or downlink slotin 3GPP LTE.

FIG. 3 illustrates an example resource grid for one uplink or downlink slot in 3GPP LTE.

Referring to FIG. 3, an uplink slot includes a plurality of OFDM (orthogonal frequency division multiplexing) slice boundary in the time domain and NUL reference blocks (RBs) in the frequency domain. The OFDM symbol is to represent one symbol period, and depending on systems, may be denoted an SC-FDMA symbol, OFDMA symbol, or symbol period. The resource block is the unit of resource allocation and includes a plurality of sub-carriers in the frequency domain. The number, NUL, of resource blocks included in the uplink slot, depends upon an uplink transmission bandwidth configured in a cell. Each element over a resource grid is denoted a resource element.

Here, although one resource block includes 7×12 resource elements comprising seven OFDM symbols in the time domain and 12 sub-carriers in the frequency domain, as an example, the number of sub-carriers in the resource block and the number of OFDM symbols are not limited thereto. The number of OFDM symbols or the number of sub-carriers included in the resource block may change in various ways. The number of OFDM symbols may vary depending on the length of a cyclic prefix (hereinafter, "CP"). For example, in the case of normal CP, the number of OFDM symbols is 7, and in the case of extended CP, the number of OFDM symbols is 6.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

Figure 4:
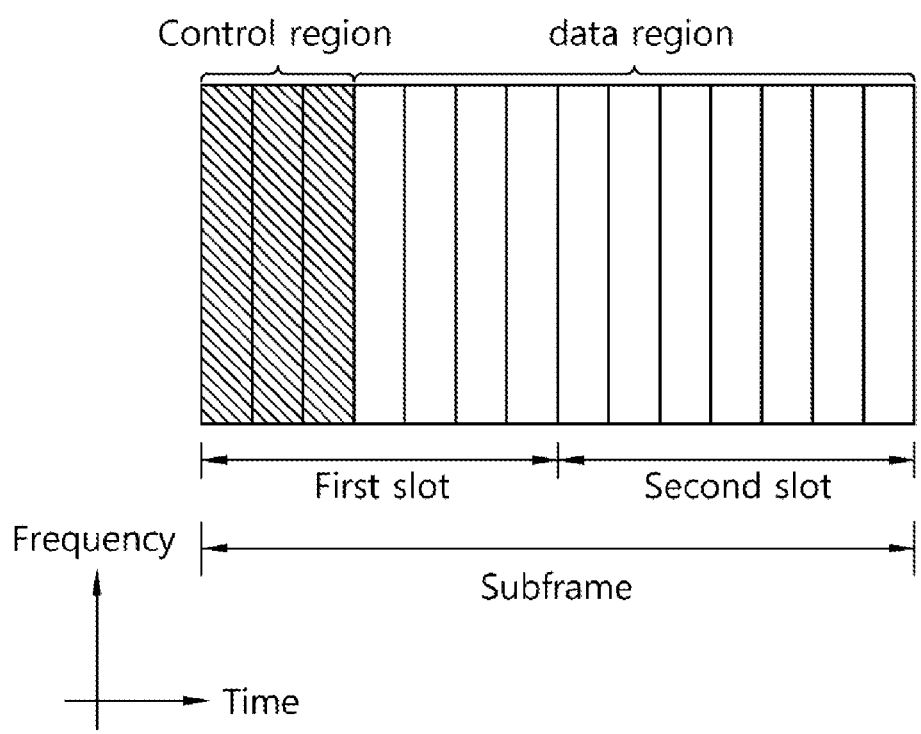
FIG. 4 illustrates the structure of a downlink sub-frame.

In 3GPP LTE, the resource grid for one uplink slot shown in FIG. 4 may also apply to the resource grid for the downlink slot.

FIG. 4 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Although one slot includes seven OFDM symbols for example, the number of OFDM symbols included in one slot may vary depending on the length of the CP (Cyclic Prefix). According to 3GPP TS 36.211 V10.4.0, in the case of normal CP, one slot includes seven OFDM symbols, and in the case of extended CP, one slot includes six OFDM symbols.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

Figure 5:
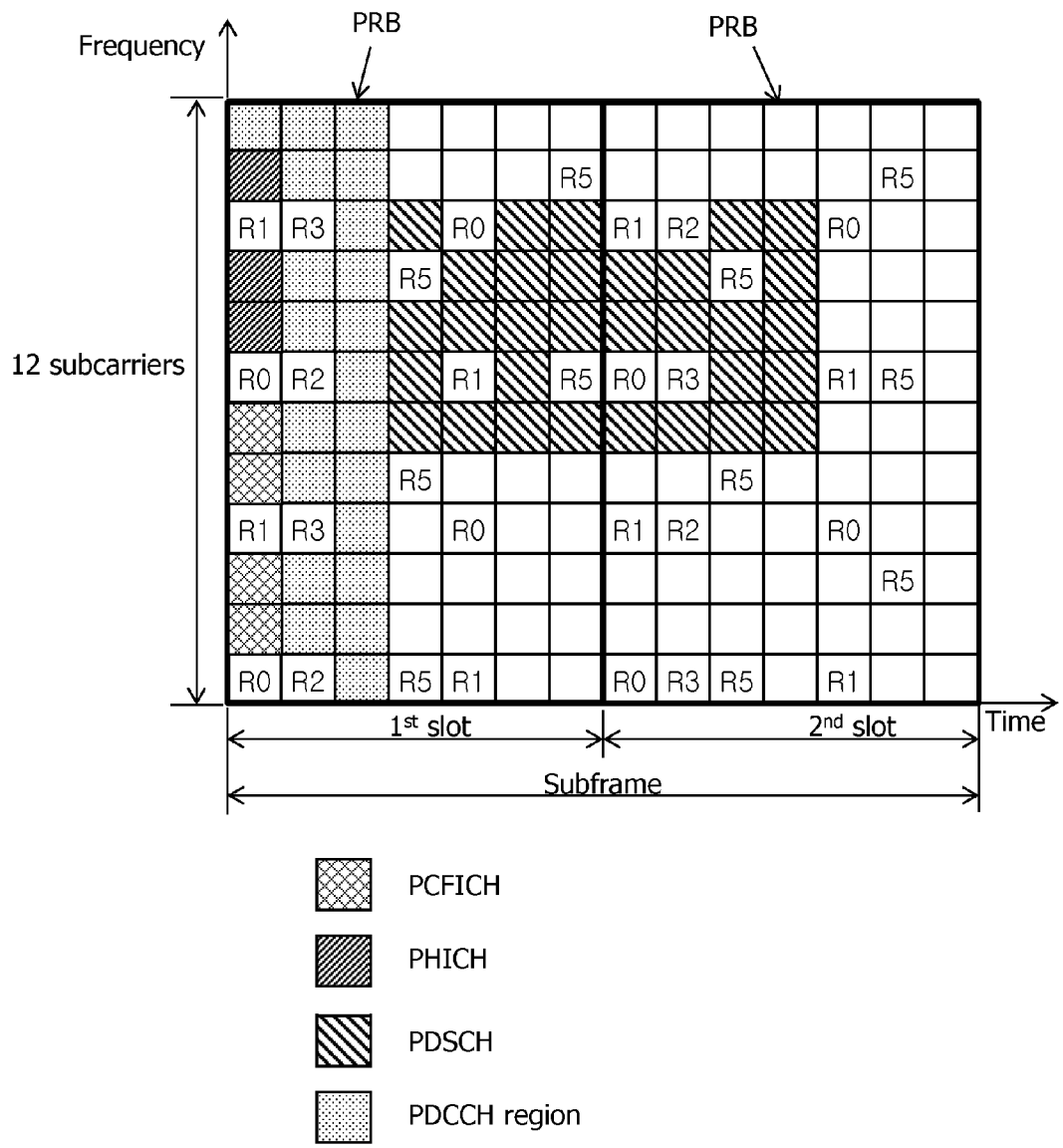
FIG. 5 illustrates an example in which a reference signal and a control channel are arranged in a DL sub-frame of 3GPP LTE.

FIG. 5 illustrates an example in which a reference signal and a control channel are arranged in a DL sub-frame of 3GPP LTE.

The control region (or PDCCH region) of the downlink sub-frame includes three first OFDM symbols, and the data region where a PDSCH is transmitted includes the remaining three OFDM symbols.

A PCFICH, a PHICH, and/or a PDCCH are transmitted in the control region. The CFI of the PCFICH indicates three OFDM symbols. The region except the resource where the PCFICH and/or PHICH are transmitted in the control region is a PDCCH region where monitors the PDCCH.

Various reference signals are transmitted in the sub-frame as well.

A CRS (cell-specific reference signal) may be received by all the wireless devices in a cell, and the CRS is transmitted over an entire downlink frequency band. In the drawings, 'R0' indicates an RE (resource element) where a CRS for a first antenna port is transmitted, 'R1' an RE where a CRS for a second antenna port is transmitted, 'R2' an RE where a CRS for a third antenna port is transmitted, and 'R3' an RE where a CRS for a fourth antenna port is transmitted.

A URS (UE-specific Reference Signal) is transmitted in the sub-frame. While the CRS is transmitted in an overall sub-frame, the URS is transmitted in the data region of a sub-frame. The URS is used for demodulating a corresponding PDSCH. In the drawings, 'R5' refers to an RE where a URS is transmitted. The URS is also referred to as a DRS (dedicated Reference Signal) or DM-RS (Demodulation Reference Signal).

The URS is transmitted in only the RB mapped with a corresponding PDSCH. In the drawings, R5's are marked off the region where PDSCH is transmitted in order to indicate the positions of REs to which the URSs are mapped.

The URS is used by only the wireless device receiving the corresponding PDSCH.

For channel status estimation, the base station transmits a channel status information-reference signal (CSI-RS) to the terminal separately from the CRS. The CSI-RS, unlike the CRS, has up to 32 different settings to reduce inter-cell interference in the multi-cell environment.

The settings on the CSI-RS differ from each other depending on the number of antenna ports in the cell and are given to be as different as possible between neighbor cells. CSI-RSs are differentiated depending on the type of CP. Depending on frame structure types (frame structure type 1 is FDD, and frame structure type 2 is TDD), there are a setting applying to both frame structure type 1 and frame structure type 2, and a setting applying only to frame structure type 2.

Meanwhile, as per 3GPP TS 36.211 V10.4.0, the uplink channels include the PUSCH, the PUCCH, the SRS (Sounding Reference Signal), and the PRACH (Physical Random Access Channel).

Figure 6:
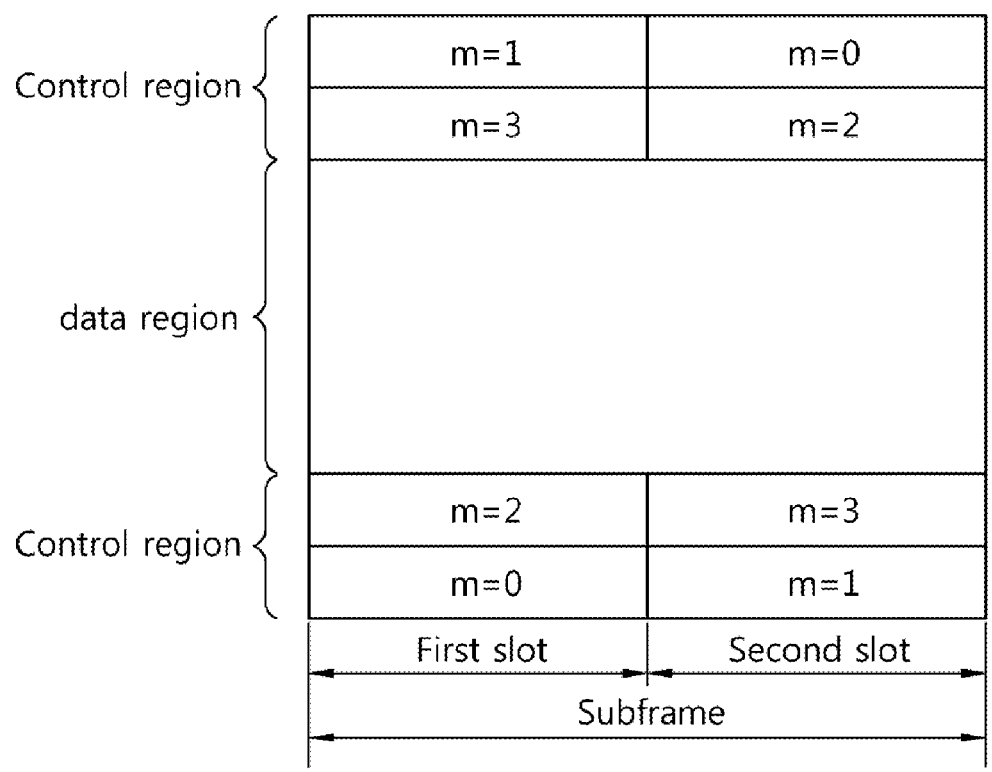
FIG. 6 illustrates the structure of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is changed with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
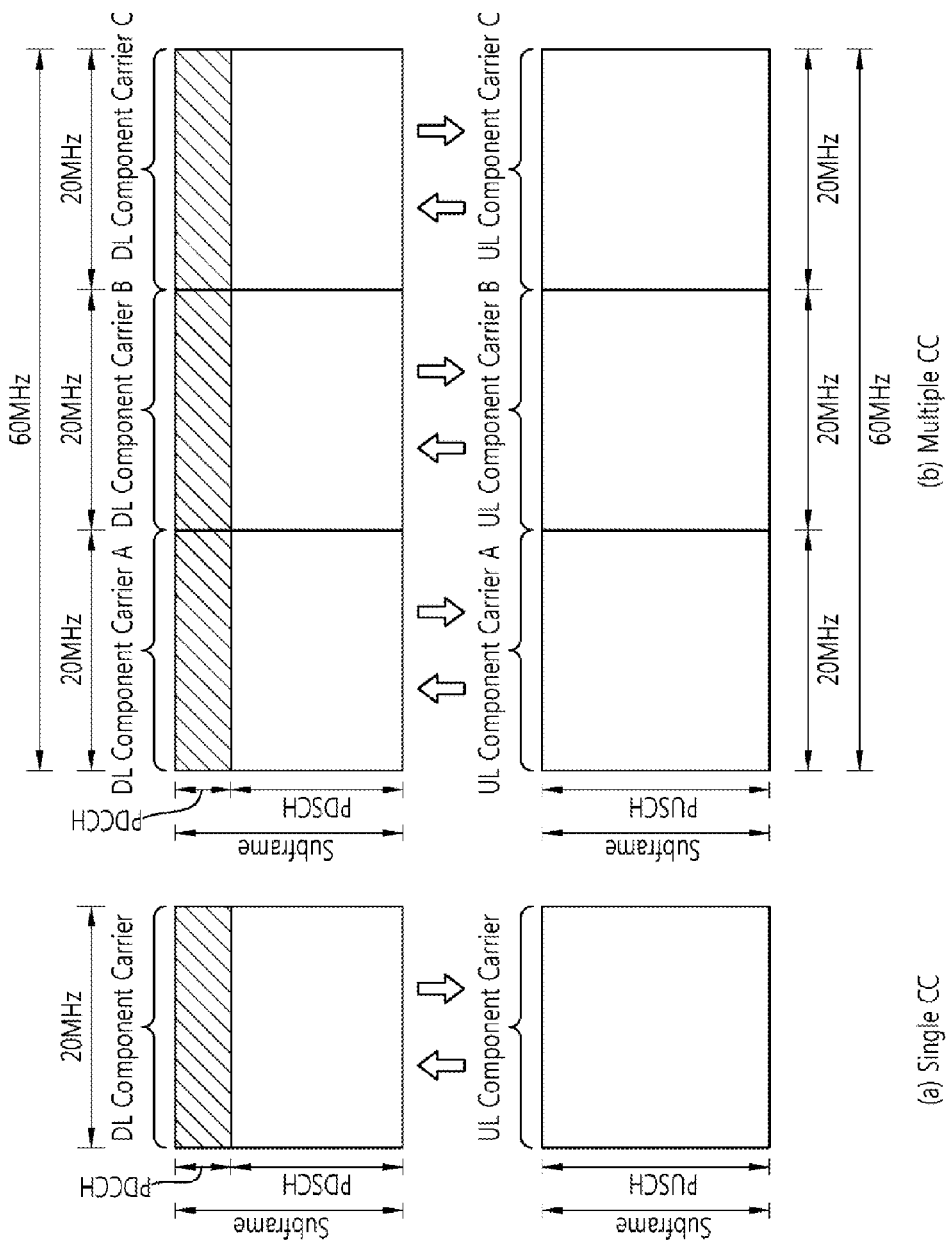
FIG. 7 illustrates an example of comparing a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carriers are contiguous and the case where the control channels are non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be changed by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC (carrier #0)+20 MHz CC (carrier #1)+20 MHz CC (carrier #2)+20 MHz CC (carrier #3)+5 MHz CC (carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
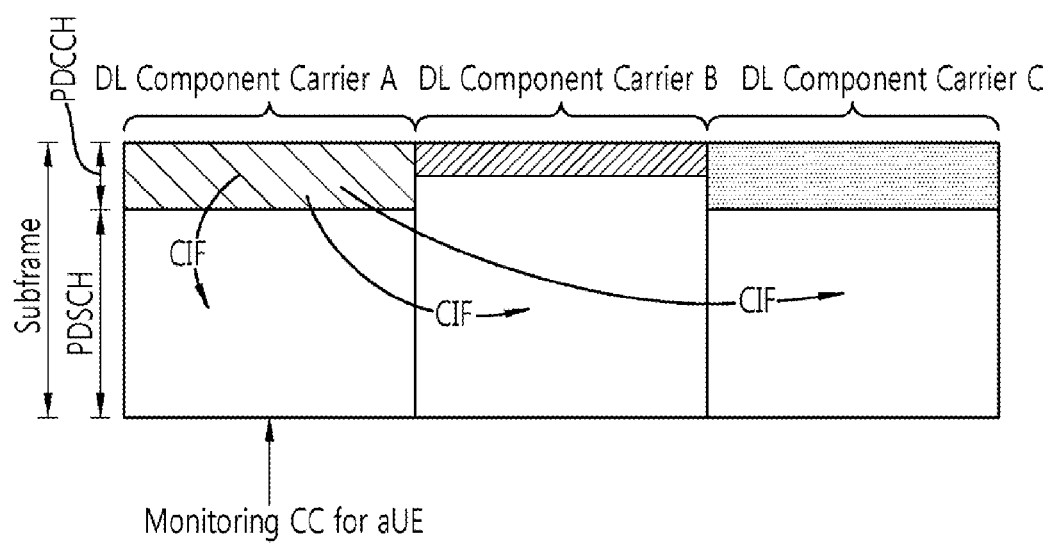
FIG. 8 illustrates an example of cross carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Hereinafter, an aspect of the present invention is described.

Figure 9A:
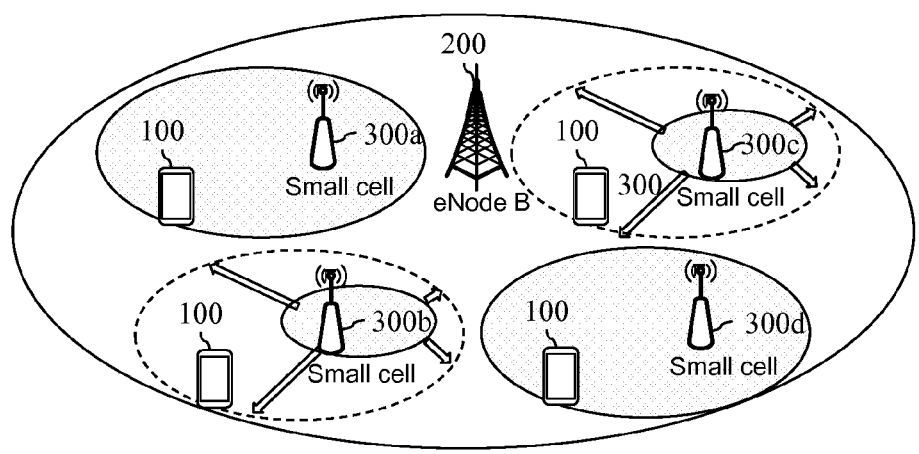
FIG. 9a is a view illustrating an environment of a heterogeneous network in which macro cells and small cells are mixed, which is likely to be adopted in a next-generation wireless communication system.

FIG. 9a is a view illustrating an environment of a heterogeneous network in which macro cells and small cells are mixed, which is likely to be adopted in a next-generation wireless communication system.

In connection with next-generation communication standards including 3GPP LTE-A, under discussion is the heterogeneous network in which one or more overlapping small cells 300a, 300b, 300c, and 300d, having low transmit power, e.g., pico cells, femto cells, or micro cells, are present in the coverage of a conventional macro cell 200.

Referring to FIG. 9a, the macro cell 200 may overlap one or more small cells 300. The service of macro cell 200 is offered by a macro base station (eNodeB, MeNB). As used herein, the terms "macro cell" and "macro base station" may be interchangeably used. A UE 100 linked to the macro cell 200 may be denoted a macro UE 100. The macro UE 100 receives a downlink signal from the macro base station and transmits an uplink signal to the macro base station.

The small cells 300a, 300b, 300c, and 300d are denoted femto cells, pico cells, or micro cells as well. The service of a small cell is provided by a pico base station (eNodeB), a home base station (HeNB), or a relay node (RN). For convenience, the pico eNodeB, home eNodeB (HeNB), and the relay node (RN) are collectively referred to as a home base station (HeNB). As used herein, the terms "micro cell" and "home base station" may be interchangeably used. Small cells may be classified into OA (open access) cells and closed subscriber group (CSG) cells depending on accessibility. The OA cell means a cell from which the UE 100 may receive a service whenever necessary without separate access limitation. On the contrary, the CSG cell means a cell from which only particular permitted UEs 100 may receive a service.

As such, in the heterogeneous network, the macro cell is set to a primary cell (Pcell), and the small cells are set to secondary cells (Scells), thus filling holes in the coverage of the macro cell. Further, the small cells may be set to primary cells, and the macro cell may be set to a secondary cell (Scell), thus boosting the overall performance.

Meanwhile, the small cells 300b and 300c as shown may expand or shrink their coverage depending on circumstances in order to reduce interference with other neighbor small cells 300a and 300d or the macro cell 200. As such, expanding and shrinking coverage is denoted cell breathing. Or, the small cells 300b and 300c may turn on or off depending on circumstances.

Figure 9B:
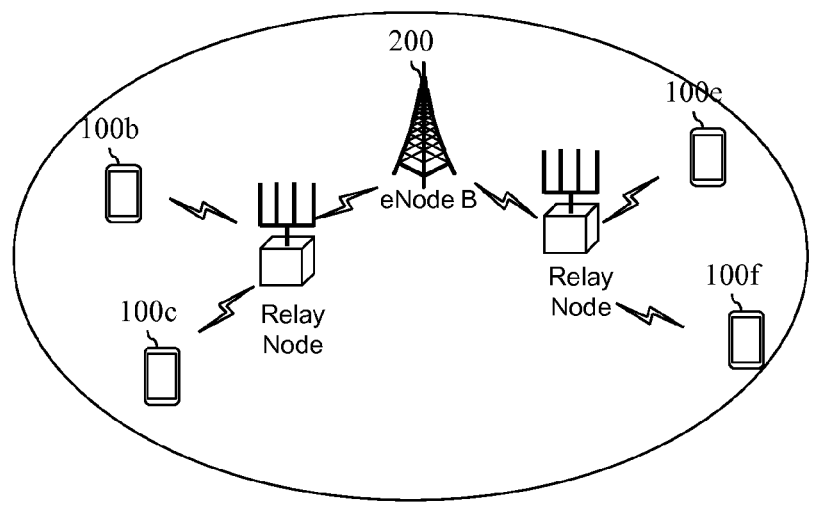
FIG. 9b illustrates an environment adding a relay node.

FIG. 9b illustrates an environment adding a relay node.

As shown in FIG. 9b, the relay node may be adopted in the next-generation wireless communication system. The relay node relays signals for UEs 100b, 100c, 100e, and 100f positioned at the outer edge of the macro cell 200.

Such relay node may be implemented by a UE pursuant to the next-generation communication system.

Further, the next-generation wireless communication system may consider adopting the movable relay node as an effort to reduce excessively frequent handover of UEs in a large-sized transporting means (e.g., a train or bus). In this case, the movable relay node may perform handover between a plurality of macro cells instead of the multiple UEs in the transporting means.

Figure 10:
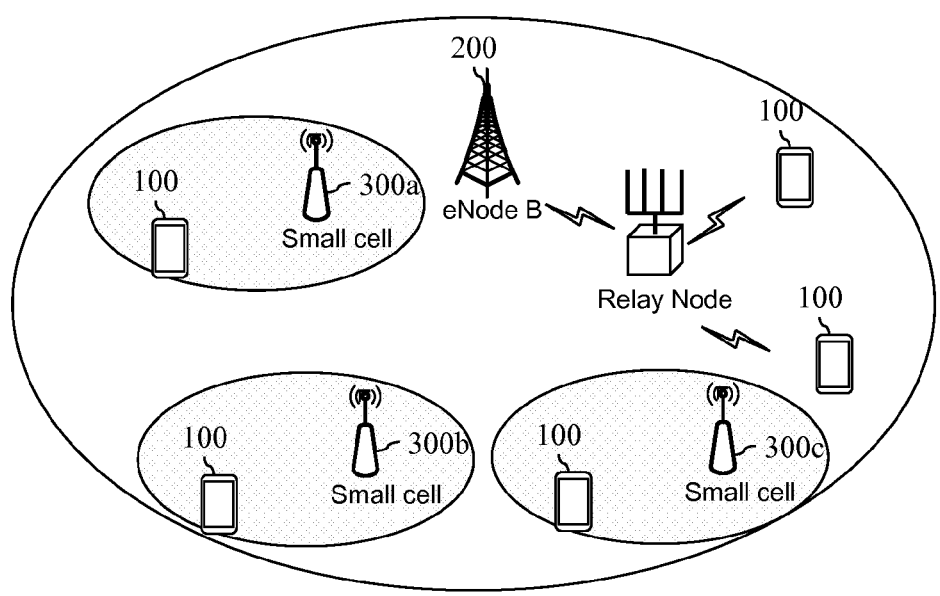
FIG. 10 is a view illustrating an example of a combination of the environment shown in FIG. 9a and the environment shown in FIG. 9b.

FIG. 10 is a view illustrating an example of a combination of the environment shown in FIG. 9a and the environment shown in FIG. 9b.

Figure 11:
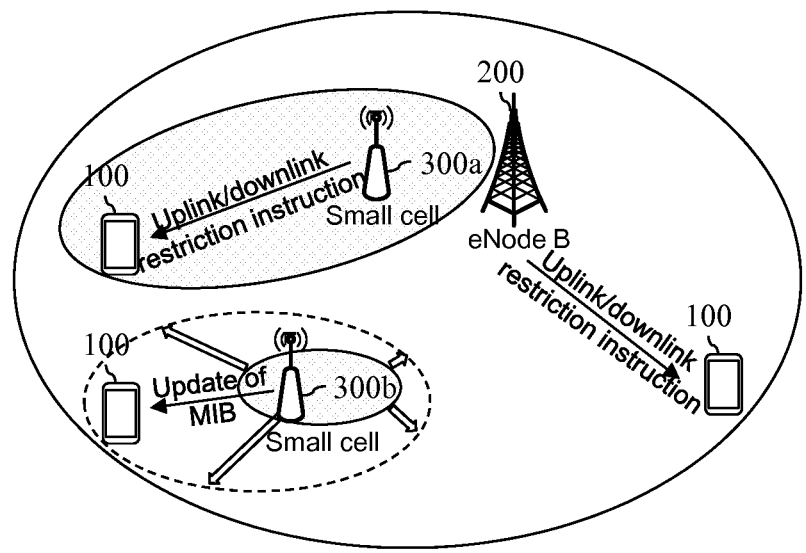
FIG. 11 is a view illustrating a brief example of the concept of embodiments according to the disclosure.

As can be seen from the above-description and FIG. 11, the next-generation mobile communication system is predicted to adopt the relay node and small cells having small cell coverage and turn-on/off capability and to have the increased frequency and area of use.

However, when multiple small cells 300 are dense and the state of the cells is changed over time, inter-cell coordination may be difficult or inefficient. Further, interference management, unless immediately conducted, may be less effective.

Basically, for some physical channels to which a scheduling scheme may apply, the interference issue may be mitigated by allowing the corresponding cell to properly adjust scheduling. However, for other physical channels (e.g., PRACH, PUCCH, periodic SRS, PUSCH, PUSCH/PDSCH transmitted without reception of PDCCH, (e)PHICH, CRS, or PSS/SSS), the cell cannot perform scheduling, and thus, the interference issue cannot be addressed.

In order to prevent or mitigate interference, the method of restricting resources available in the higher layer should be used, and this is very inefficient. As mentioned above, the PUSCH/PDSCH without reception of PDCCH means the one based on SPS (Semi-Persistent Scheduling).

Accordingly, according to an embodiment of the disclosure, there is suggested a scheme for restricting the whole or partial uplink transmission during some sub-frames by utilizing downlink control information on a particular UE for the purpose of removing interference signals.

Hereinafter, embodiments of the disclosure are briefly described as follows.

FIG. 11 is a view illustrating a brief example of the concept of embodiments according to the disclosure.

As shown in FIG. 11, according to an embodiment of the disclosure, a macro cell 200 or a small cell 300a may transmit an instruction for restricting uplink/downlink to a UE 100. Accordingly, the UE 100 may abstain from transmitting a particular physical channel on uplink during a particular sub-frame or radio frame, or the UE 100 in the macro cell 200 or small cell 300a might not transmit a particular physical channel on downlink during a particular sub-frame or radio frame. Here, the DCI may be transmitted through a PDSCH as well.

Meanwhile, it is critical to determine what particular uplink physical channel or particular downlink physical channel is not transmitted. Accordingly, this is described in further detail in connection with the first embodiment of the disclosure.

Meanwhile, the uplink/downlink restriction instruction may contain the type of restricted physical channel or information on the particular restricted physical channel. In particular, the uplink/downlink restriction instruction may be transferred to the UE through the DCI (DL control information) of a PDCCH according to an example. Thus, according to the second embodiment of the disclosure, there is proposed the structure of an uplink/downlink restriction instruction, i.e., a DCI.

Meanwhile, when the small cell 300b shown needs to be turned on or off or needs to be changed for interference management in order to mitigate interference, system information transmitted from the small cell 300b to the UE 100, e.g., MIB (Master Information Block), also needs to be updated. Thus, according to the third embodiment of the disclosure, there is proposed a scheme for efficiently varying and managing system information such as MIB.

Hereinafter, embodiments of the disclosure are described in detail with reference to the drawings.

Figure 12:
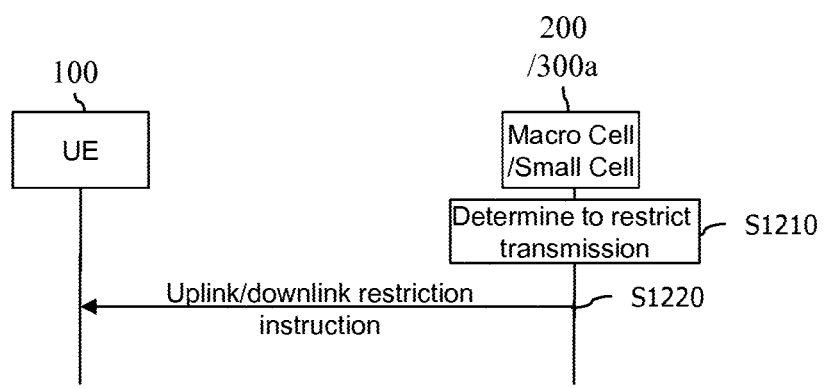
FIG. 12 is a view illustrating a first embodiment of the disclosure.

FIG. 12 is a view illustrating a first embodiment of the disclosure.

As described above, the first embodiment of the disclosure is to determine what physical channel is restricted for transmission by an uplink/downlink restriction instruction. As described above, for some physical channels that may be applied with a scheduling scheme, a corresponding cell may mitigate interference by properly performing scheduling. Thus, such physical channels may be better off when left without transmission restriction. However, for other physical channels, the corresponding cell cannot do scheduling, and thus, such physical channels may be better when restricted on transmission depending on circumstances.

The PUCCH, periodic SRS, PRACH, and PUSCH that may be transmitted even without the UE receiving the PDCCH may be among the scheduling-unavailable uplink physical channels. The CRS, TRS (Tracking Reference Signal), PSS, SSS, PHICH, CSI-RS, and PDSCH that may be transmitted without the cell transmitting a PDCCH may be among the scheduling-unavailable downlink physical channels. Here, the PUSCH or PDSCH that is not based on the PDCCH is the one based on SPS (semi-persistent scheduling). Among the above-mentioned uplink physical channels and downlink physical channels, there may be channels whose transmission may be reduced to some degree by restricting schedulable resources. Examples of such channels include the PUCCH including only HARQ-ACK feedback, PUSCH/PDSCH not based on PDCCH, and PHICH, and such channels may be better off without transmission restriction.

Accordingly, the macro cell 200 or small cell 300a determines an uplink physical channel and downlink physical channel whose transmission is to be restricted based on what has been mentioned above (S1210).

Subsequently, the macro cell 200 or small cell 300a transmits an uplink/downlink transmission restriction instruction to the UE 100 (S1220). For example, the uplink/downlink transmission restriction instruction may be included in a DCI and transmitted through a PDCCH as will be described below. Or, the uplink/downlink transmission restriction instruction may be transmitted to the UE 100 through a higher layer signal.

Then, the UE 100 determines a physical channel whose transmission is restricted depending on the information included in the transmission restriction instruction. Further, the UE 100 determines a duration of a radio frame or a sub-frame during which transmission is restricted. When the instruction is transferred to the UE 100 through the DCI, the UE 100 determines the duration of the radio frame or sub-frame in which the DCI is valid as the transmission-restricted duration.

Meanwhile, as necessary, the transmission restriction may be for uplink physical channels only. For example, when the UE 100 needs to receive sync signals (e.g., PSS and SSS) and TRS, and major downlink information, only transmission of uplink channels is restricted without putting limitation on downlink physical channels.

Or, as necessary, it may be all uplink physical channels that may be restricted on transmission.

Or, as necessary, it may be the other uplink channels than periodic SRS and PRACH that may be restricted on transmission. Here, the PRACH may be excluded only when transmittable within one sub-frame. Further, the PRACH may be excluded only when having PRACH preamble format 4. This is done to permit transmission when a relatively small area is put under interference. Meanwhile, for some uplink channels, their transmission may be restricted or not depending on the type of UCI included.

Exceptions to transmission restriction depending on the type of UCI are described below.
  PUCCH including HARQ-ACK may be excluded from
    transmission restriction.
  PUCCH including HARQ-ACK or CSI may be excluded
    from transmission restriction. Here, the CSI is an
    RI-type CSI.
  PDCCH triggering-based uplink channel may be
    excluded from transmission restriction. The PDCCH
    triggering-based uplink channels may be a combination
    of the aperiodic CSI, aperiodic SRS, and PRACH by a
    PDCCH order.
  CSI-RS and/or CRS (or TRS) may be restricted for
    transmission.
  A higher link channel set by a higher layer may be set as
    a target for transmission restriction. Examples of uplink
    channels set by the higher layer may include the
    PRACH, periodic SRS, periodic CSI, and PUSCH
    (Msg3) corresponding to a random access response.
    Here, Msg3 may be excluded from transmission restriction. This is done to normally terminate a random
    access procedure that is in process.

The physical channels targeted for transmission restriction described so far are merely examples, and various combinations of uplink/downlink channels may be configured. There is a need for determining whether to retransmit uplink channels or UCI that have been restricted for transmission or dropped during a particular sub-frame or sub-frame duration. In particular, in case the UCI is an HARQ-ACK, the UE may abstain from retransmission after DTX processing as an effort to maintain HARQ timing and delay the HARQ-ACK so that the information may be retransmitted at a subsequent time that the information may be transmitted. When selecting the subsequent time that transmission is possible after the delay, the UE may select a sub-frame after as many sub-frames as the maximum HARQ process number considering HARQ timing, and may select an earliest uplink sub-frame among times when transmission is possible.

Figure 13:
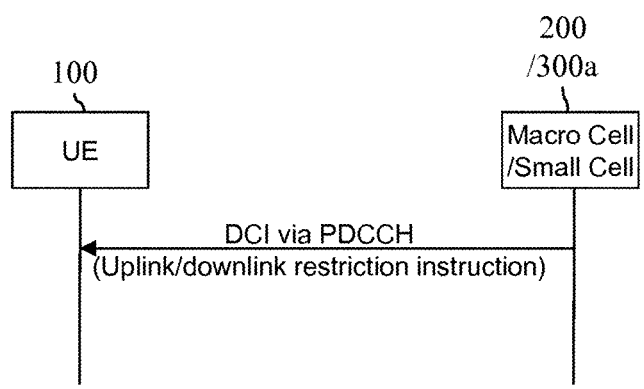
FIG. 13 is a view illustrating a second embodiment of the disclosure.

FIG. 13 is a view illustrating a second embodiment of the disclosure.

As shown in FIG. 13, according to the second embodiment of the disclosure, an uplink/downlink restriction instruction may be included in the DCI of a PDCCH and may be transmitted to the UE 100.

The DCI may be UE-specific.

The uplink/downlink restriction instruction may be contained in a new format of DCI. Or, the uplink/downlink restriction instruction may be included in some fields or a new field of the legacy DCI format. When the uplink/downlink restriction instruction is included in the new field, the UE 100 may determine whether the new field has been included through a higher layer signal received.

For example, the DCI format may have a format such as format 3/3a, and the cell 200/300a may inform this through a higher layer signal. Informing through the higher layer signal may be done UE-specifically or in units of UE groups.

Specifically, the DCI containing the transmission restriction instruction may contain one bit indicating whether to transmit per UE. When receiving the DCI in sub-frame n, the UE may or might not transmit and/or receive physical channels predetermined in sub-frame n+k.

Or, the UE may determine a sub-frame duration for transmission restriction through a higher layer signal received, and upon reception of a DCI including the restriction instruction, may or might not transmit and/or receive all or some physical channels during the duration from sub-frame n+k.

Or, when detecting a DCI or information in the DCI for transmission restriction in sub-frame n, the UE might not transmit and/or receive predetermined physical channels from sub-frame n+k and may resume transmission and/or reception on the physical channels after successfully detecting a DCI including information releasing transmission restriction or DCI corresponding to release of transmission restriction (re-enabling).

As another example, the information on each UE included in the DCI may have two bits and may indicate whether to restrict transmission only for the periodic CSI and periodic SRS. The UE may select physical channels targeted for transmission restriction through a scrambling code on the DCI or CRC of the DCI.

As described above, when a new DCI format is used, some fields of the legacy DCI format are used, or a new field in the legacy DCI format is used for instructing restriction, additional information for transmission restriction may be transferred to the UE through a PDSCH. The additional information for transmission restriction may include one or more of (i) information indicating whether to restrict transmission, (ii) information on duration targeted for transmission restriction, (iii) information on physical channels targeted for transmission restriction, and (iv) TPC information referenceable upon power control after transmission restriction has been released. The duration information may indicate the number of sub-frames. The information on the physical channels targeted for transmission restriction may be represented in the form of a bitmap. Or, a set of physical channels may be known to the UE through a higher layer signal, and then, a transmission-restricted set may be indicated to the UE through a DCI.

Hereinafter, a configuration of a DCI and a related UE procedure for transmission restriction are specific examples.

As a first example, a PDCCH including a new DCI format or some fields of the legacy DCI format includes (i) of the above-mentioned additional information. In this case, when successfully detecting the PDSCH or DCI for transmission restriction in sub-frame n, the UE might not transmit and/or receive predetermined physical channels in sub-frame n+k. Here, k may be an integer equal to or more than 4 in the case of FDD, and may be one corresponding to an uplink timing corresponding to a HARQ process only for sub-frames targeted for transmission restriction in the case of TDD. Or, when the higher layer signal received by the UE indicates a sub-frame duration for transmission restriction and the UE receives a DCI including a transmission restriction instruction, the UE might not transmit or receive all or some physical channels for the duration from sub-frame n+k. Or, when successfully detecting the PDSCH or DCI for transmission restriction in sub-frame n, the UE might not transmit and/or receive predetermined physical channels from sub-frame n+k. Thereafter, upon receiving a PDSCH or DCI including information releasing transmission restriction or after successfully detecting a PDSCH or DCI corresponding to the release of transmission restriction (re-enabling), the UE may transmit and/or receive the physical channels.

As a second example, a PDCCH including a new DCI format or some fields of the legacy DCI format includes (i) and (iii) of the above-mentioned additional information. In this case, when successfully detecting the PDSCH or DCI for transmission restriction in sub-frame n, the UE might not transmit and/or receive physical channels corresponding to (iii) of the additional information in sub-frame n+k. Or, the UE does not transmit and/or receive predetermined physical channels from sub-frame n+k when successfully detecting a DCI for transmission restriction in sub-frame n and is allowed to transmit and/or receive the physical channels after detecting a DCI including information releasing the transmission restriction.

As a third example, a PDCCH including a new DCI format or some fields of the legacy DCI format includes (i) and (ii) of the above-mentioned additional information. In this case, when successfully detecting the PDSCH or DCI for transmission restriction in sub-frame n, the UE might not transmit and/or receive physical channels for a duration indicated by (ii) of the additional information from sub-frame n+k.

As a fourth example, a PDCCH including a new DCI format or some fields of the legacy DCI format includes (i), (ii), and (iii) of the above-mentioned additional information. In this case, when successfully detecting the PDSCH or DCI for transmission restriction in sub-frame n, the UE might not transmit and/or receive physical channels corresponding to (iii) of the additional information for a duration indicated by (ii) of the additional information from sub-frame n+k. Or, the UE may additionally apply (iv) of the additional information. Further, the UE might not transmit an ACK/NACK for the PDSCH for transmission restriction.

Meanwhile, when there are separately a DCI (or PDSCH) configuring the transmission restriction and a DCI (or PDSCH) releasing the transmission restriction configured, an ACK/NACK may be transmitted depending on whether the UE succeeds detection on the PDCCH (or PDSCH) corresponding to each DCI. In this case, the sub-frame configured with transmission restriction may be a sub-frame after the cell receives an ACK for the DCI. Further, the DCI releasing the transmission restriction configured may be transferred to the UE through a PDCCH order. This is done to allow the UE to fit into a proper TA when uplink transmission is not done during a predetermined period.

On the other hand, a downlink scheduling DCI and an uplink grant DCI may be used for a downlink restriction instruction and an uplink restriction instruction, respectively. Additionally, upon detecting a DCI having the same field as SPS validation/release of DCI format 0/1A decoded using a C-RNTI, the UE may determine this as the downlink restriction instruction and uplink restriction instruction, and in this cse, the restricted duration and restricted channel may be configured using the value of the MCS field.

Meanwhile, a power control scheme upon transmission restriction is described.

When all or some physical channels are not transmitted/received for a particular sub-frame or sub-frame duration, a detailed scheme on power control is required. When physical channels restricted for transmission include the PDCCH, the UE fails to detect a TPC for a predetermined time. Accordingly, the UE may configured a TPC field in a DCI including a transmission restriction instruction and the UE may perform power control using the same after the transmission restriction is released. When a DCI for releasing transmission restriction is separately received, the UE may use the TPC field of the DCI. An example of the TPC information may be interpreted as $\delta PUSCHc$ for PUSCH and $\delta PUCCH$ for PUCCH.

Next, such a scenario may be considered where the UE may detect a TPC for a sub-frame duration where transmission restriction is set for some channels. In this case, when updating $f_c(i)$ or $g(i)$ to perform uplink power control, the UE may set a TPC value detected for a sub-frame duration corresponding to the transmission restriction on the DCI to 0.

Figure 14:
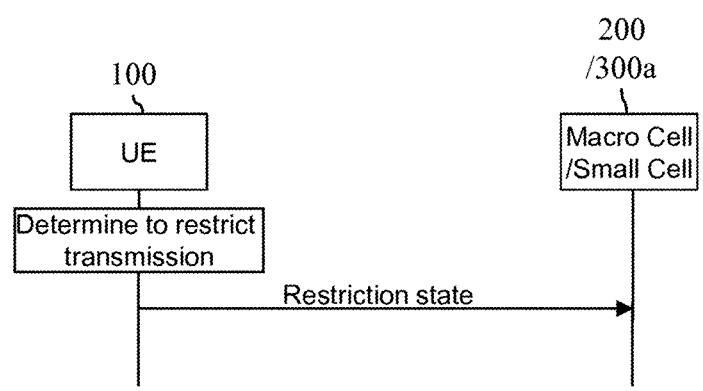
FIG. 14 illustrates a change to FIG. 12.

FIG. 14 illustrates a change to FIG. 12.

As can be seen from FIG. 14, the UE 100 may be determined to abstain from actively transmitting an uplink channel from an interference management perspective. For example, the UE, for saving power, may determine to restrict transmission and reception of physical channels. However, when transmission restriction is done by the UE alone, the cells 200 and 300a might be aware of this, and unnecessary DTX detection and re-transmission may be required. Accordingly, the UE 100 needs to inform the cells 200 and 300a of the transmission restriction state. The following is a specific example of such situation.

As a first example, the UE 100 may inform the cell of the transmission restriction state through a UCI value combination. As an example, informing may be done with a combination of a HARQ-ACK and a CSI. An example of the combination may be set to process all HARQ-ACKs as ACKs, to set the MCS index of CSI values to correspond to the lowest TBS and modulation order or to process all the HARQ-ACKs as NACKs and to make the MCS index of the CSI values correspond to the highest TBS and modulation order. Such combination is a combination that is least likely for a HARQ_ACK to occur according to channel environments. The combination of HARQ-ACK and CSI is useful when the UE 100 may conduct simultaneous transmission. When the cells 200 and 300a detect a plurality of combinations, the cells 200 and 300 may be allowed to be aware of the transmission restriction state.

As a second example, the UE 100 may inform the cell of the transmission restriction state through a PRACH. To that end, the cell may transmit a PRACH setting through which the UE may inform transmission restriction through a higher layer signal.

As a third example, the UE 100 may inform the cell of the transmission restriction state through an SRS. To that end, the cell may transmit an SRS setting through which the UE may inform transmission restriction through a higher layer signal.

As a fourth example, the UE 100 may inform the cell of the transmission restriction state using a higher layer signal through a PUSCH.

Figure 15:
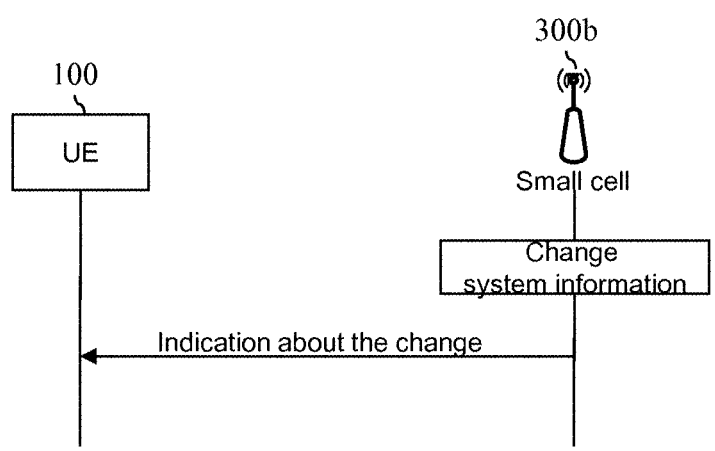
FIG. 15 is a view illustrating a first embodiment of the disclosure.

FIG. 15 is a view illustrating a first embodiment of the disclosure.

As can be seen from FIG. 15, the small cell 300b to be possibly adopted by the next-generation system may vary cell information or system information depending on circumstances. For example, the system information may be changed according to traffic or for interference management. The cell information or system information may include a cell on/off state, bandwidth, downlink carrier frequency, CP length, PHICH setting, and an SFN (system frame number). As a method for varying the information, the scheme of, after disconnecting all the UEs linked to the cell, varying the information and reconnecting the UEs may be taken into account. However, such scheme may be inefficient given a possible delay and the likelihood that multiple system information may overlap. Accordingly, major information such as MIB or SIB needs to be changed while the UEs remain linked to the cell. However, there are required a scheme for addressing ambiguity between the small cell and UE during a reconfiguration process, a signal for varying major system information such as MIB, and a relevant procedure.

The following is a specific example of a method for, upon varying information on MIB and SIB, transferring the same to the UE.

As a first example, as MIB information varies, an indicator indicating the change is added to a reserved field of the MIB or SIB and is transmitted from the small cell 300b to the UE 100. The indicator may initially have a value, 0. For example, when the information (e.g., DL BW or PHICH setting) in the MIB is changed while the value of the indicator is 0, the value of the indicator may be changed to 1. Again, when the value of the MIB or SIB information is changed, the value of the indicator is changed from 1 to 0. Accordingly, the UE 100 linked to the small cell 300b may prepare or initiate a procedure according to the change in the MIB or SIB information depending on whether the indicator value toggles. Upon reception of the indicator, the UE 100 may re-read the MIB or SIB in order to verify the change in the MIB or SIB or may grasp the changed state by re-reading the MIB or SIB in order to periodically identify whether the MIB or SIB is changed.

As a second example, the small cell 300b may transfer an indicator for varying information (e.g., DL BW or PHICH) in the MIB or SIB to all the linked UEs through a higher layer signal, e.g., an RRC signal. Upon detecting the higher layer signal, the UE may prepare or initiate a procedure according to the change in the MIB information.

As a third example, the small cell 300*b* may transfer, to all linked UEs, an indicator for varying the MIB or SIB information through a broadcast message (e.g., a paging signal). When receiving the broadcast message, the UE may prepare or initiate a procedure according to the change in the MIB or SIB information.

Meanwhile, the small cell 300*b* may additionally transmit, to the UE, information on the time (a time when a relevant procedure is to be initiated) that major system information, such as the MIB or SIB is changed. Further, the small cell 300*b* may additionally transfer a fallback configuration that is to be used from the current time until the changed time. Further, the small cell 300*b* may transfer, to the UE 100, information indicating what information (e.g., a new bandwidth) is changed. Further, e.g., when the center frequency is changed, the small cell 300*b* may transfer, to the UE, information on whether the current center frequency is maintained before until the changed time arrives or a new center frequency or another center frequency is operated.

Meanwhile, the information indicating what information is changed may also contain information on a tracking offset, cell ID, virtual cell ID, and various cell-unique setting parameters in addition to the system information such as MIB or SIB. For example, when the macro cell with which the small cell 300*b* is synced is changed to vary the border of the sub-frame, the small cell 300*b* may inform the UEs of the tracking offset in order for the UE to be synced quickly.

Meanwhile, when the small cell 300*b* attempts to change cell-unique parameters although it, like the SRS, is included in the SIB, this may be known or the start time may be informed. Such information may be transferred in order for any one small cell to request to change information on another small cell. In such case, information on an ID or index of the cell may be transferred together. The UE, upon reception of the information, unless specially indicated about fallback operation, may be assumed to perform DRX/DTX until the changed time. When the tracking offset is given, the UE may be assumed to receive an additional TRS (tracking reference signal) at the changed time for quick sync. This additional TRS may be higher in RS density than the normal TRS or may use a preamble through which the UE may do quicker syncing. Or, the small cell may allow the UE to be synced more rapidly by sending normal TRSs over several sub-frames.

On the other hand, upon varying major system information such as MIB or SIB, it might not be guaranteed to make sure that the UE always properly detect the information cell-uniquely transmitted to the UE linked to the small cell 300*b*. Further, it may be required to set a proper criterion for the time that the major system information such as SIB or MIB is changed.

The following is a specific exemplary procedure for a method for applying what is changed in major system information such as MIB or SIB.

As a first example, information on an X duration may be predetermined or may be received through a higher layer signal. Accordingly, the UE applies what is changed the X duration after the sub-frame when the indicator as to whether major system information such as MIB or SIB is changed. X may be represented in the form of msec or with the number of sub-frames. When the indicator is present in a reserved field in the MIB, X may be restricted to a multiple of the period of PBCH.

As a second example, after receiving an indicator as to whether major system information such as MIB or SIB is changed, the UE 100 may receive an MAC layer signal including a trigger message for actually applying the change. When detecting the MAC layer signal, the UE may apply the changed information from Y predetermined sub-frames after receiving the MAC signal.

As a third example, after receiving an indicator as to whether major system information such as MIB or SIB is changed, the UE 100 may receive physical channels including a trigger message for actually applying the change. The physical channels may be in the form of PDCCH and/or PDSCH mapped to a CSS or be physical channels of a new type. When the PDCCH is put to use, a particular combination of DCI values may be used. When detecting the trigger message, the UE may apply the changed information Y predetermined sub-frames after the sub-frame where the UE has received the trigger message.

On the other hand, there may be required a new communication scheme between a cell and UEs operating regardless of corresponding information (e.g., DL BW or PHICH setting) in order to address the ambiguity issue for the time when major system information such as MIB or SIB is changed.

The following is a specific example for a procedure for varying MIB information (or other major information) between a small cell and a UE.

As a first example, when an indicator corresponding to the change in the MIB information is configured, the small cell 300*b* sets six middle RBs to a virtual BW and sets the extended PHICH section (duration) to a virtual PHICH setting and performs scheduling on the same. The PCFICH, PHICH, (e)PDCCH, and PDSCH are scheduled. Then, the UE 100 performs blind coding on a PDCCH search space according to the set virtual DL BW and PHICH setting.

As a second example, when an indicator corresponding to the change in the MIB information, the small cell 300*b* sets the minimum value of the DL BW in the MIB targeted for change and the DL BW in the current MIB to a virtual BW, and sets the larger one in PHICH duration of the current MIB and the MIB targeted for change to a virtual setting for setting PHICH. Here, the method for setting the PHICH duration may set extension in the case at least one information is extended and may set normal for the rest. Thereafter, the small cell 300*b* performs scheduling on PCFICH, PHICH, (e)PDCCH, and PDSCH according to the set virtual BW and PHICH setting. Then, the UE 100 performs blind coding on a PDCCH search space according to the set virtual DL BW and PHICH setting.

As another example for restricting the BW targeted for scheduling, the small cell 300*b* fills the RB region other than the target RB region using a dummy PDCCH, dummy PCFICH, or dummy PHICH and may allow the PDCCH to be transmitted to the UE 100 to be mapped to the RB region of interest. In this case, however, the UE 100 still suffers from the problem that blind decoding is conducted on the whole RB region. Further, what can be considered is to prevent transmission on the downlink channel for the duration of changing the MIB using the DCI for transmission restriction.

On the other hand, although the UE 100 properly detects the changed information and information on the change during the course of varying major system information on cell such as MIB or SIB, the UE 100 might not support the changed information. For example, when the small cell 300*b* transmits the changed information to the UE 100 in the direction of extending the DL BW, some UEs 100 might not support the extended DL BW. In such case, the UE needs to do handover from the small cell to another cell.

The following is a specific example for a procedure for a UE that, when major system information such as MIB or SIb is changed, cannot support the changed information.

As a first example, when the UE 100 detects information on a change in major system information such as MIB or SIB but fails to support the changed information, the UE 100 may transmit a handover request to the small cell 300b. The handover request from the UE 100 may be transferred through a physical layer or a second layer signal. As an example for transferring the handover request from the UE 100, the following scheme may be taken into account.

i) The handover request may be achieved by the UE 100 transmitting an RSRP or RSRQ. In this case, upon transmission of information such as RSRP/RSRQ, a value reduced by X dB or X, instead of the actual measured value may be transmitted. Here, X may be predetermined or determined by a higher layer.

ii) The handover request may be represented as a certain combination of values on an uplink physical channel. The certain combination may simply represent an indication on the handover request from the UE or may include additional information (e.g., the reason why the changed value is not supported or change is rejected).

iii) The handover request may be transferred through a physical layer or a second layer signal. The physical layer or second layer signal may contain information related to a UE RNTI, serving cell ID, and handover request. The handover request-related information may contain information not supported by the UE 100 in varying the system information or may contain the reason why the UE 100 rejects to vary the information as the system information is changed. Examples of the reason why the UE 100 rejects to vary the information may include, e.g., when it is determined to be difficult or inefficient to meet the traffic demand of UE 100 as resource utilization (RU) is changed and when radio channel environments such as RSRP/RSRQ in the parameter values are not good.

As a second example, the small cell 300b may transmit, to the UE 100, the information on the change in the system information such as MIB or SIB, together with information on neighbor cells. The information on the neighbor cells may include a physical cell ID, cell load (e.g., RU), and the number of UEs linked to the cell. When detecting the information, the UE 100, if able to support the changed information, performs a procedure for applying the changed information, and if not able to support the changed information, may hand over to another cell based on the information on the neighbor cells. The UE 100 that cannot support may measure the RSRP/RSRQ for all or some select cells in the list based on the received information on the neighbor cells. Thereafter, the UE 100 may transmit the measurement result to the small cell 300b, and the small cell 300b may then choose a target cell appropriate for the UE 100 and initiates a handover procedure.

An example where the system information on the small cell 300b is changed under the circumstance where the small cell 300b is a primary cell has been described thus far. However, a circumstance in which the small cell 300b is a secondary cell is now described below.

Figure 16:
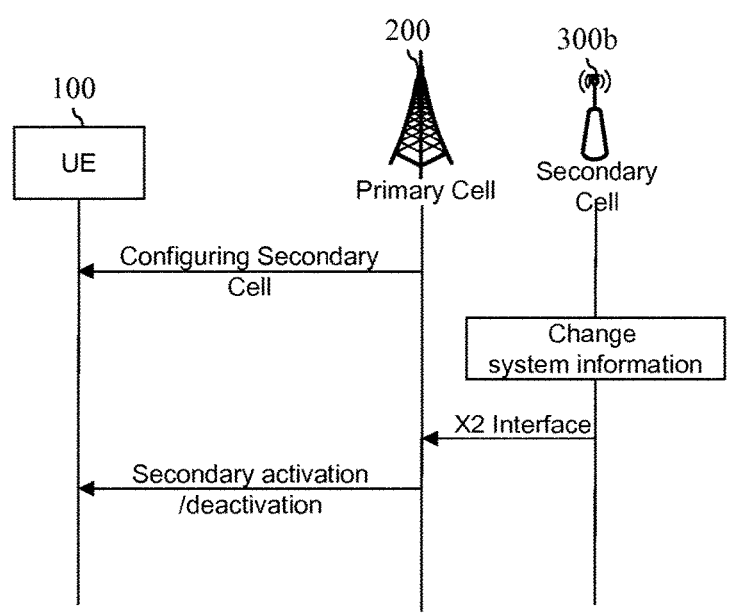
FIG. 16 is a view illustrating a change to FIG. 15.
Figure 17:
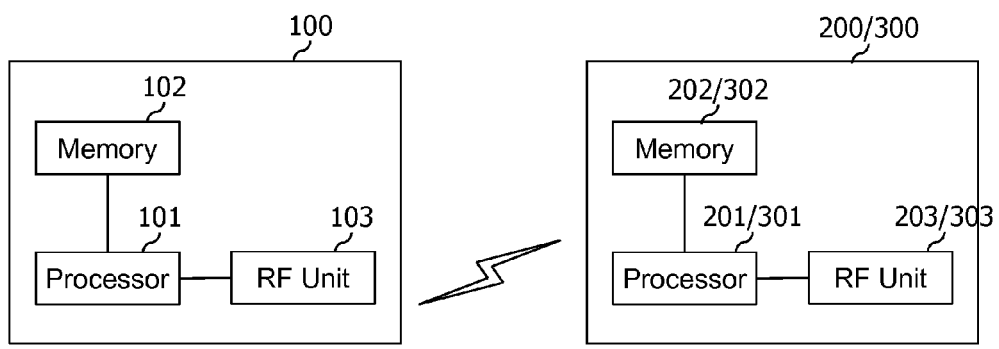
FIG. 17 is a block diagram illustrating a wireless communication system where an embodiment of the present disclosure is implemented.

FIG. 16 is a view illustrating a change to FIG. 15.

As can be seen from FIG. 16, from a carrier aggregation perspective, the macro cell 200 may be a primary cell of the UE 100, and the small cell 300b may be a secondary cell of the UE 100.

As such, the small cell 300b operating as a secondary cell may vary major system information including a cell on/off state, system bandwidth, CP length, PHICH setting, and a center frequency, depending on cell environments or traffic. For example, assuming that sets of the system information of the small cell 300b includes inf_1, inf_2, and inf_3, inf_1 may correspond to a first secondary cell of the small cell 300b, inf_2 may correspond to a second secondary cell, and inf_3 may correspond to a third secondary cell. The system information sets, i.e., inf_1, inf_2, and inf_3, might not be activated at the same time. Accordingly, the small cell 300b varying the information may be deemed as deactivating any one secondary cell while activating another secondary cell. On the position of the UE, if the small cell 300b is currently operating as inf_1, the UE 100 may be recognized as a first secondary cell. When the system information of the small cell 300b is changed from inf_1 to inf_2, the UE 100 may recognize that the first secondary cell is deactivated and the second secondary cell is activated.

The following is a specific example of a procedure in which the small cell 300b varies system information through a cell activation/deactivation process of carrier aggregation (CA). Assume in the following example that system information sets for the small cell 300b may be represented as inf_1, inf_2, . . . , inf_N. The system information sets may be combinations of DL carrier frequencies, system bandwidths, CP lengths, and PHICH settings.

As a first example, the UE 100 recognizes the small cell 300b having system information sets including inf_1, inf_2, . . . , inf_N (e.g., inf_1=(f1, 20 Mhz, normal CP), inf 2=(f2, 20 Mhz, normal CP), . . . , inf_N) as multiple different cells. Accordingly, the primary cell 200 may set the small cell 300b to several secondary cells for the UE 100 through a secondary cell setting procedure in carrier aggregation (CA). In this case, when the physical cell IDs and DL frequencies remain the same but additional information (e.g., system bandwidth, CP length, and PHICH setting) differs, it can be set to different secondary cells. Meanwhile, the primary cell 200 may bundle secondary cells corresponding to inf_1, inf_2, . . . , inf_N of the small cell 300b into one group, and the small cell 300b sets indexes (e.g., index=k, k=1, 2, . . . , N) for the major information sets being currently used. The group may be assumed as a single legacy Rel-11 set secondary cell. As such, determination of the number of BARQ-ACK bits and measurement of RSRP/RSRQ may be conducted on one group. This is done to maximally use activation of only one secondary cell in one group by bundling secondary cells into a group even when several secondary cells are configured. In other words, in order to prevent the number of HARQ-ACK bits from being changed when the activated secondary cell is changed in one group, the number of HARQ-ACK bit numbers may be set to the maximum number of HARQ-ACK bits for the secondary cells in the group. Likewise, the UE 100 may conduct RSRP/RSRQ measurement only on the secondary cell corresponding to the information set that the small cell 300b is currently using. Accordingly, the UE 100 may take no action on the remaining secondary cells in the group.

As a second example, the primary cell may conduct a secondary cell configure/add procedure so that the UE 100 recognizes the small cell 300b having system information sets, e.g., inf_1, inf_2, . . . , inf_N, as different secondary cells. The primary cell may inform the UE 100 of the cell index for the information set being currently used by the small cell 300b and the cell indexes corresponding to the remaining information sets through a higher layer signal. The cell index may be a secondary cell index. Then, the UE 100 excludes the cell index corresponding to the information set being not used by the small cell 300b when performing all the operations conducted with respect to the configured secondary cells. The operation on the cell index corresponding to the information set being not used by the small cell 300*b* may be transferred to the UE 100 through a higher layer signal. This is done to allow the small cell 300*b* to select a major information set to be changed upon performing a task for changing major information. Specifically, the small cell 300*b* may inform the UE 100 of a set of secondary cells that is not to be used when determining to manage HARQ-ACKs and RRMs among the configured secondary cells through a higher layer signal.

As a third example, the primary cell 200, when conducting a secondary cell add procedure to set the small cell 300*b* that may have system information sets, e.g., inf_1, inf_2, . . . , inf_N, as information to a secondary cell of the UE 100, may inform the UE 100, in the form of RRC, that the information on the small cell 300*b* may be changed. For example, the primary cell may previously set the information sets that may be owned by the small cell 300*b* to inf_1, inf_2, . . . , inf_N while setting the small cell 300*b* to one secondary cell for the UE 100, and may previously designate an index for an information set to be currently used. This index may be changed through a secondary cell reactivating or deactivating/activating procedure or secondary cell reconfiguring procedure, and if the index is changed, the information set may be changed. The time of the change may be designated. For example, when the information is changed through reactivation, it may be assumed that the information is changed from n+8. When the information set is desired to be changed through a secondary cell activating/deactivating or reactivating procedure, the index of the set may be added to an active MAC CE and the same may be transferred to the UE 100. The index of the set may be transferred together with the active MAC CE or separately from the active MAC CE. As another scheme, the primary cell may simultaneously set secondary cells corresponding to inf_1, inf_2, . . . , inf_N. In this case, the information index may be configured to be separately set by a higher layer in a form similar to the concept of activation/deactivation for the small cell 300*b*.

As described above, on the position of the UE 100 operating, as a secondary cell, the small cell 300*b* that may be operated with any one of a plurality of information sets, when the information set of the small cell 300*b* is changed, a secondary cell corresponding to the information set prior to the change among a predetermined number of secondary cells as many as the number of information sets of the small cell 300*b* may be deactivated, and the secondary cell corresponding to the changed information set may be activated, thus enabling efficient application of the changed information.

Further, as described above, even when the information on the secondary cell is changed, there may be ones that may be supported by the UE 100 or might not be supported by the UE 100 depending on the changed information. In such case, one of the information sets of the small cell 300*b* may be selected depending on the UE 100's supportability.

The embodiments described above may be implemented by various means. For example, the embodiments of the present invention may be implemented by hardware, software, or a combination thereof. A specific example is described with reference to the drawings.

FIG. 19 is a block diagram illustrating a wireless communication system where an embodiment of the present disclosure is implemented.

The base station 200/300 includes a processor 201/301, a memory 202/302, and an RF (radio frequency) unit 203/303. The memory 202/302 is connected with the processor 201/301 and stores various types of information for driving the processor 201/301. The RF unit 203/303 is connected with the processor 201/301 and communicates radio signals. The processor 201/301 implements functions, processes, and/or methods as proposed herein. In the above-described embodiments, the operation of the base station may be implemented by the processor 201/301.

The UE 100 includes a processor 101, a memory 102, and an RF unit 103. The memory 102 is connected with the processor 101 and stores various types of information for driving the processor 101. The RF unit 103 is connected with the processor 101 and communicates radio signals. The processor 101 implements functions, processes, and/or methods as proposed herein.

The processor may include an ASIC (application-specific integrated circuit), other chipset, a logic circuit, and/or a data processing device. The memory may include a ROM (Read-Only Memory), a RAM (Random Access Memory), a flash memory, a memory card, a storage medium, and/or other storage device. The RF unit may include a baseband circuit for processing radio signals. When an embodiment is implemented in software, the above-described schemes may be embodied in modules (processes, or functions, etc.) performing the above-described functions. The modules may be stored in the memory and executed by the processor. The memory may be positioned in or outside the processor and may be connected with the processor via various well-known means.

In the above-described example system, the methods are described based on the flowcharts with a series of steps or blocks, but the present invention is not limited to the order of the steps, and rather, some steps may be performed simultaneously or in different order with other steps. It should be appreciated by one of ordinary skill in the art that the steps in the flowcharts do not exclude each other and that other steps may be added to the flowcharts or some of the steps may be deleted from the flowcharts without influencing the scope of the present invention.

What is claimed is:

1. A method for applying changed system information, the method performed by a terminal and the method comprising:
receiving, by the terminal and from a cell, an indicator indicating a change in system information;
receiving, by the terminal and from the cell, time information indicating when the change in the system information is to be applied;
determining, by the terminal, whether the indicator indicates the system information is to be changed;
when the indicator indicates the system information is to be changed, determining, by the terminal, time to apply the changed system information using the time information;
determining whether the changed system information is supported by the terminal; and
when the changed system information is not supported by the terminal, transmitting to the cell information that a handover is required by the terminal,
wherein the indicator is included in a reserved field of an MIB (Master Information Block).

2. The method of claim 1, wherein the system information includes one or more of an on or off state of the cell, a system bandwidth, a downlink carrier frequency, a CP (cyclic prefix) length, a PHICH (physical hybrid-ARQ Indicator Channel) setting, and an SFN (system frame number).

3. The method of claim 1, wherein the indicator is received even when any one or more of a tracking offset, a cell ID, a virtual cell ID, and information on various cell-unique setting parameters, other than the system information, are changed.

4. The method of claim 1, wherein the indicator is represented in a one-bit length, and wherein the indicator is toggled to any one of bit 0 and bit 1 whenever the system information is changed.

5. The method of claim 1, wherein the time information indicates the number k of sub-frames or k ms.

6. The method of claim 1, further comprising,
performing a blind decoding of a physical downlink control channel (PDCCH) in a search space within a virtual bandwidth,
wherein the virtual bandwidth is set by the cell when the terminal receives the indicator from the cell.

7. The method of claim 1, wherein information on another neighbor cell is received together with the changed system information for a case where the terminal cannot support the changed system information.

8. The method of claim 1, wherein when the cell is a secondary cell of carrier aggregation (CA), the cell operates as a first secondary cell before the system information is changed, and the cell operates as a second secondary cell after the system information is changed.

9. The method of claim 8, wherein handover is performed from the first secondary cell to the second secondary cell at the time to apply the changed system information.

10. The method of claim 8, further comprising:
receiving a message for requesting to deactivate the first secondary cell corresponding to the system information before the change in the system information and to activate the second secondary cell corresponding to the system information after the change in the system information.

11. A terminal applying changed system information, the terminal comprising:
a reception unit configured to receive an indicator indicating a change in system information from a cell and receive time information indicating when the change in the system information is applied; and
a processor configured to:
determine whether the indicator indicates the system information is to be changed, and when the indicator indicates the system information is to be changed, determine time to apply the changed system information using the time information,
determine whether the changed system information is supported by the terminal, and
transmit to the cell information that a handover is required by the terminal when the changed system information is not supported by the terminal,
wherein the indicator is included in a reserved field of an MIB (Master Information Block).

* * * * *